United States Patent [19]

Dyck et al.

[11] Patent Number: 4,780,979
[45] Date of Patent: Nov. 1, 1988

[54] ICE FISHING DEVICE

[76] Inventors: Peter "M" Dyck, 367-2nd Street, Winkler, Manitoba, Canada, R6W 2R5; Elmer D. Wiebe, General Delivery, Morden, Manitoba, Canada, R0G 1J0

[21] Appl. No.: 112,481

[22] Filed: Oct. 26, 1987

[51] Int. Cl.⁴ .............................................. A01K 97/12
[52] U.S. Cl. ....................................................... 43/17
[58] Field of Search ........................................ 43/16, 17

[56] References Cited

U.S. PATENT DOCUMENTS

| | | | |
|---|---|---|---|
| D. 196,888 | 11/1963 | Pilsner | 43/17 |
| 1,253,746 | 1/1918 | Teeling | 43/17 |
| 1,777,496 | 1/1930 | Killory | |
| 2,970,400 | 2/1961 | Nolin | 43/17 |
| 3,010,238 | 11/1961 | Crumrine, Jr. et al. | 43/16 |
| 3,134,188 | 7/1962 | Petersen | |
| 3,578,748 | 5/1971 | Hurd | 43/17 |
| 3,745,698 | 7/1973 | Williams | 43/17 |
| 3,984,935 | 10/1976 | Peterson | 43/17 |
| 3,999,322 | 12/1976 | Kooker | |
| 4,253,262 | 3/1981 | Johnson | 43/17 |
| 4,621,446 | 11/1986 | Anderson | 43/17 |
| 4,667,432 | 5/1987 | Torgrimson | 43/17 |

FOREIGN PATENT DOCUMENTS

| | | |
|---|---|---|
| 984147 | 2/1976 | Canada . |
| 190172 | 5/1979 | Canada . |
| 1111248 | 10/1981 | Canada . |
| 221632 | 7/1968 | Sweden ................................. 43/17 |

Primary Examiner—Kurt Rowan
Attorney, Agent, or Firm—Stanley G. Ade; Adrian D. Battison; Murray E. Thrift

[57] ABSTRACT

An ice fishing rig comprises an integrally molded black plastics base member which has a base plate and a plug extending downwardly from the underside of the base plate for engaging and closing a drilled hole in the ice. An upstanding support integrally molded with base plate comprises a flat plate member with a handle hole on one side of which is supported a reel which a handle hole on one side of which is supported a reel which extends out over the base plate and carries a line which extends from the reel through a hole in the base plate in the plug into the water. The plug includes a tapered portion for engaging 6 inch or 8 inch holes and a cylindrical portion for engaging a 10 inch hole. A signalling flag is pivotally mounted on the upstanding support and a spring bias into a raised position. The flat can be latched beneath the handle of the reel so when the reel is rotated by a pull on the line the flag is released and springs to the signalling position.

15 Claims, 2 Drawing Sheets

1

ICE FISHING DEVICE

This invention relates to an ice fishing rig of a type which can be used at a hole drilled or formed in the ice to support a fishing line depending from the rig into the water.

Various ice fishing rigs are currently available including a type in which a cross brace structure stands on the ice over the hole and supports an upstanding post from which a line is depended into the water. One serious problem with devices of this type is that the hole tends to refreeze and thus interfere with the removal of a caught fish so it is often necessary for the user to continually break the ice as it forms which is time consuming and tedious.

It is one object of the present invention, therefore, to provide an improved ice fishing rig which is effectively self contained and which sits over the hole in the ice in a manner to prevent or inhibit refreezing of the hole while properly supporting the line extending into the hole. It is a further object of the present invention to provide a device of this type which can automatically signal in a simple and mechanically reliable manner the pulling of the line by a fish.

According to the first aspect of the invention, therefore, there is provided an ice fishing rig comprising a rigid base plate member having transverse dimensions sufficient to cover a hole formed in the ice and to stably support the rig on the ice, a hole formed through the plate member from an upper surface above the ice to a lower surface adjacent the water, a support member attached to said plate member and upstanding therefrom at a position adjacent to but at one side of the hole, a reel mounted on the support member for rotation about a substantially horizontal axis, a line carried on the reel for dispensing therefrom and winding thereon, the reel being arranged on the support member so as to allow dispensing of said line directly through said hole from the reel and a manually graspable handle on the reel for actuation to wind in the line, said base plate member and said upstanding support member being integrally molded from a synthetic plastics material.

It is one advantage of the invention therefore that the device is simply manufactured from an integrally molded piece which fully covers the hole and prevents the hole becoming blocked by falling ice or by refreezing. Preferably the integrally molded base plate member includes a plug portion on the underside thereof which extend into the hole so as to effectively close the hole. The integral molding or plastics material provides insulation so that the cold air above the hole is prevented from refreezing the water which is generally of course above the freezing point.

According to the second aspect of the invention, there is provided an ice fishing rig comprising a rigid base plate member having transverse dimensions sufficient to cover a hole formed in the ice and to stably support the rig on the ice, a hole formed through the plate member from an upper surface above the ice to a lower surface adjacent the water, a support member attached to said plate member and upstanding therefrom at a position adjacent to one side of the hole, a reel mounted on the support member for rotation about a substantially horizontal axis, a line carried on the reel for dispensing therefrom and winding thereon, the reel being arranged on the support member so as to allow dispensing of said line directly through said hole from the reel and a manually graspable handle on the reel for actuation to wind in the line, said base plate member being molded from a synthetic plastics material and including a plug portion extending downwardly from an underside thereof which is circular in cross section and having a transverse dimension sufficient to cover the crosssectional area of the hole such that the plug portion closes the hole and projects downwardly at least partly into the hole.

The use of the plug on the molded base plate member allows the plug to effectively seal off the hole in the ice to provide a more efficient insulation against refreezing of the water within the hole.

According to a third aspect of the invention, there is provided an ice fishing rig comprising a rigid base plate member having transverse dimensions sufficient to cover a hole formed in the ice and to stably support the rig on the ice, a hole formed through the plate member from an upper surface above the ice to a lower surface adjacent the water, a support member attached to said plate member and upstanding therefrom at a position adjacent to one side of the hole, a reel mounted on the support member for rotation about a substantially horizontal axis, a line carried on the reel for dispensing therefrom and winding thereon, the reel being arranged on the support member so as to allow dispensing of said line directly through said hole from the reel a manually graspable handle on the reel for actuation to wind in the line, a signal member, means for mounting the signal member for pivotal movement on said rig, means for biasing said signal member into a raised position and means for latching said signal member on said reel at a lowered position thereof such that movement of the reel releases the signal member for movement to said raised position.

The simple construction of the signal member which is latched onto the reel allows a signalling of the movement of the reel with a mechanically simple and reliable construction.

With the foregoing in view, and other advantages as will become apparent to those skilled in the art to which this invention relates as this specification proceeds, the invention is herein described by reference to the accompanying drawings forming a part thereof, which includes a description of the best mode known to the applicant and of the preferred typical embodiment of the principles of the present invention in which:

FIG. 1 is a front elevational view of the device according to the invention.

FIG. 2 is a side elevational view of the device of FIG. 1.

FIG. 3 is a top plan view of the device of FIG. 1.

DESCRIPTION OF THE DRAWINGS

In the drawings like characters of reference indicate corresponding parts in the different figures.

The device comprises an integral molding 10 from a black synthetic plastics material. The molding provides a base member 11 and an upstanding support structure 12. The base 11 has an upper flat plate portion 11 which is circular in cross section having a diameter of the order of 12 inches which is sufficient to cover a drilled hole in the ice which would generally be of the order 6, 8 or 10 inches. The thickness of the base plate indicated at 13 is of the order of 1 inch. On the underside of the base plate is provided a plug member also of circular cross section indicated at 14. The plug member includes a first cylindrical portion 15 and a second tapered or conical portion 16 which is of reduced diameter relative to the cylindrical portion and tapers down to a narrowest diameter as indicated at 17. In practice the diameter of the tapered portion 16 at the lower most end 17 will be of the order of 5 inches so that when used with a 6 inch drilled hole, the tapered portion can be pressed into the hole and closes the hole with a portion of the lower most part of the tapered plug extending into the hole. When used with an 8 inch diameter hole, a larger portion of the tapered plug extends into the hole so that the top of the hole terminates adjacent the underside of the cylindrical portion 15. When used with a 10 inch hole, the cylindrical surface indicated at 15 is of 10 inch diameter and hence closes the hole and extends partly thereinto so that the base plate portion 13 has an underside 18 lying on top of the ice surface.

Figure 1:
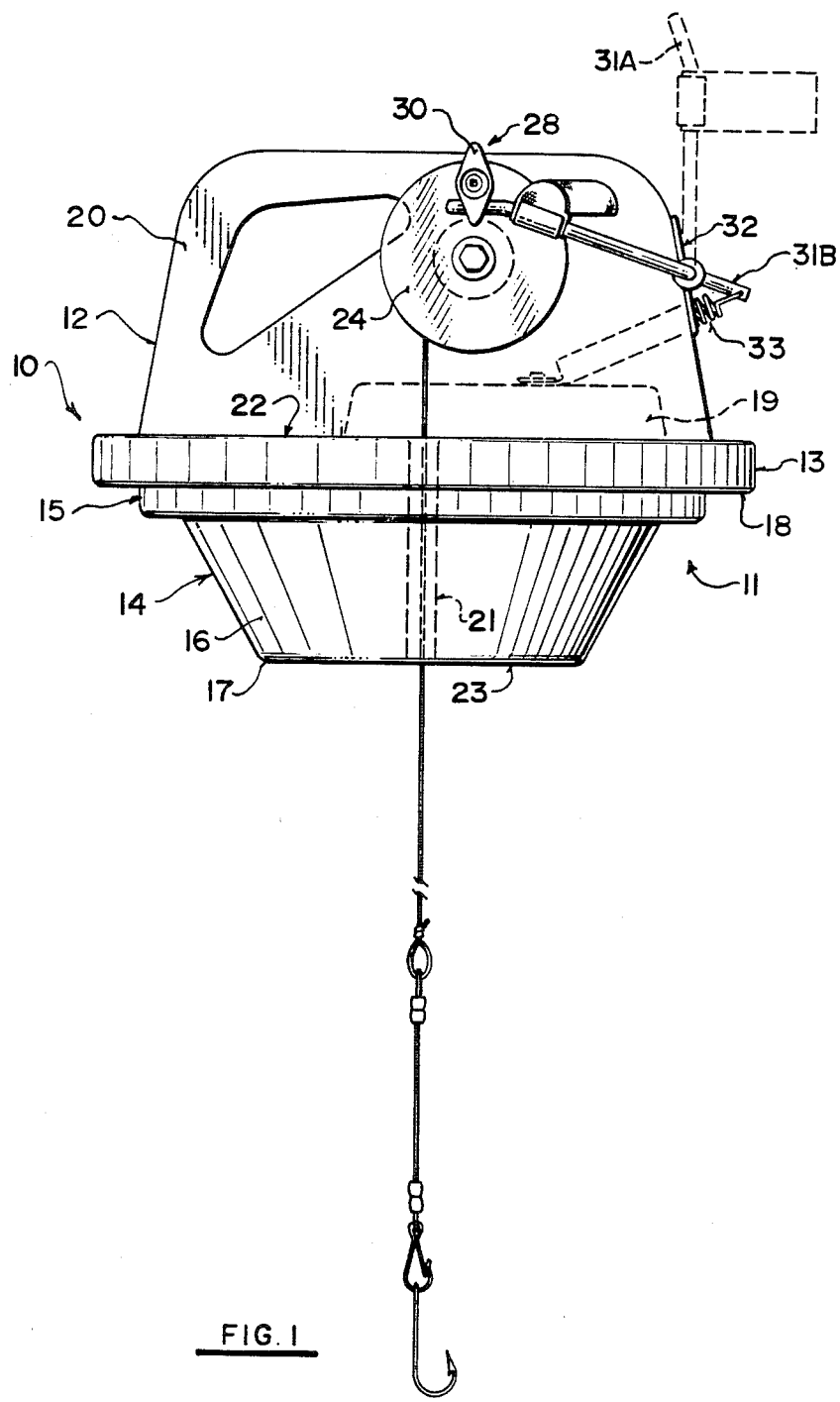
Figure 2:
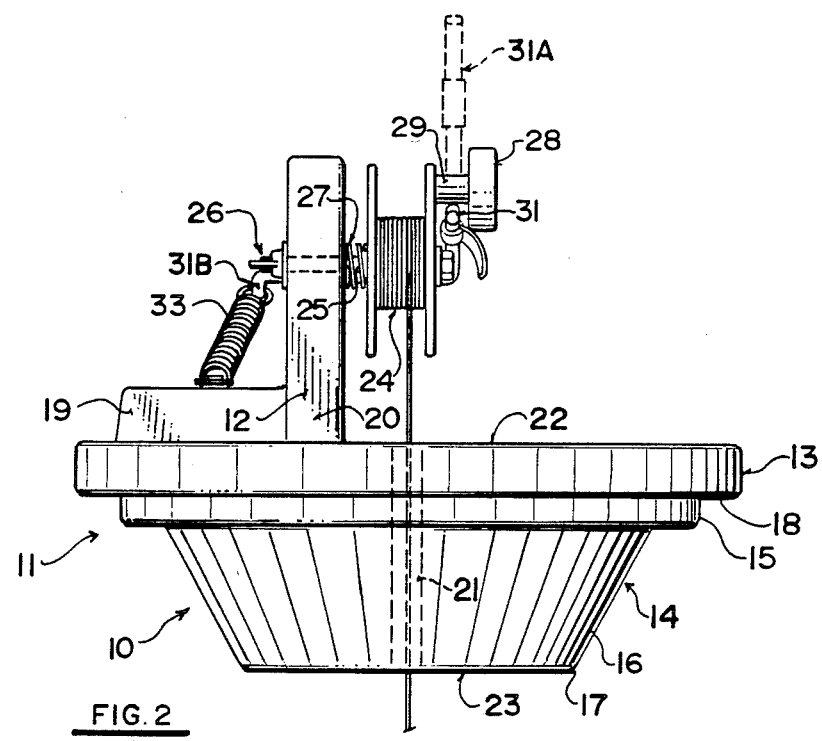
Figure 3:
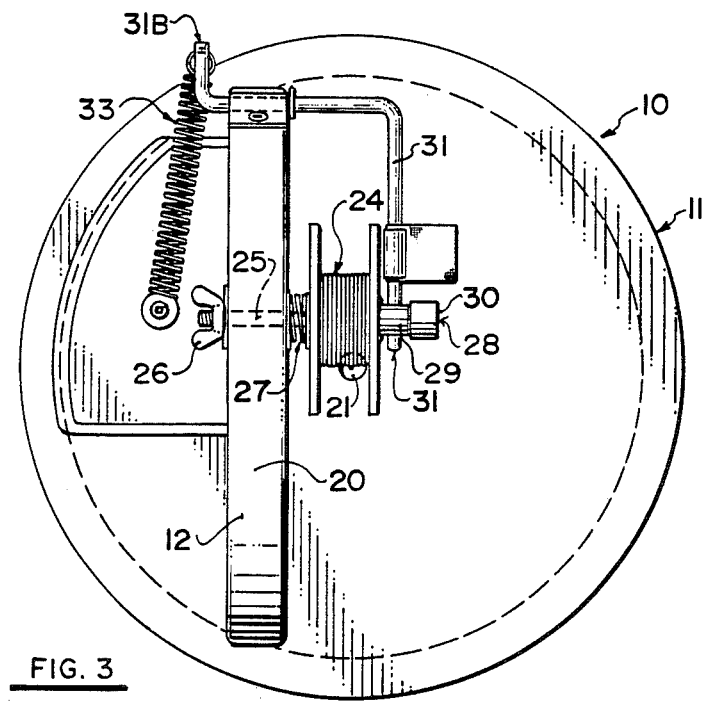

The base plate member indicated at 11 thus can engage the ice either as a friction fit or with the flat surfaces thereof resting on the ice so as to form a stable base for supporting the super structure including the upstanding support member 12.

The support member 12 comprises an elongate planar body having an underside integrally formed along its full length with an upper flat surface of the base member 11. A portion 19 of plastics material molded integrally with the support and with the base is provided for reinforcement purposes to prevent the upstanding support cracking away from the base. A triangular hole is formed through the support of a size to receive the fingers of the user as a handle.

The upstanding support provides a vertical support surface 20 which extends substantially fully across the upper surface of the base but at a position offset to one side of the centre thereof.

A hole 21 is formed through the base directly centrally thereof so as to extend from the upper surface 22 to an undersurface 23 which will in practice be adjacent the water. Mounted on the support 12 is a reel 24 which is carried on a bolt 25. The bolt 25 passes through the reel and through the support to a wing nut 26 on an outer face of the support with the wing nut being operable against a spring 27 between the support and the reel to tension the spring which thus acts to frictionally restrain movement of the reel about the horizontal axis defined by the bolt.

The height of the upstanding support 20 is such that it is just sufficient to receive the reel and support it above the upper surface 22 with the peripheral surface of the reel lying at a position relative to the hole 21 so that the line can extend directly through the hole without significant frictional engagement. The reel carries a handle 28 projecting from the face thereof remote from the support 20 so that it can be rotated manually to wind in the line onto the reel. The handle thus comprises a cylindrical base portion 29 and a cross piece 30 which are integral but rotationally mounted on the outer surface of the reel so that the cross piece when grasped manually can be held and rotated with the base rotating as the reel is moved around its axis.

A signalling flag device comprises a rod 31 which is pivotally mounted on a retaining bracket 32 carried on one side face of the upstanding support 20. The flag or rod 31 can thus move from a lowered position shown in full line in which the end of the rod is latched underneath the handle 28 against the base 29 thereof in an upper most position of the handle on the reel. When the reel thus is rotated to withdraw line through the hole 21 the handle moves away from the rod and allows it to pivot to a raised position indicated in dotted line at 31A. Biasing force to the raised position is provided by a spring 33 connected between an extension 31B of the rod and the reinforcing portion 19.

In operation, the hook is baited and dropped into the water in a drilled hole through the ice. The base unit is then moved into the hole with a plug portion cooperating with the hole to close the hole fully. The position on the plug portion to which the ice engages varies in dependence upon the diameter of the hole, as previously explained. In any case, however, the underside of the plug fully closes the hole without leaving any open area between the plug and the hole. In some cases the base plate 13 rests directly upon the ice whereas with the smaller diameter holes the base plate is raised above the ice by the engagement between the tapered portion of the plug and the periphery of the hole.

The flag is then latched under the handle of the reel so as to be held in the lowered position. The device is then left with the bait and hook sitting in the water for an approaching fish. When the bait is taken and the hook engaged, the fish pulls the line which rotates the reel and releases the flag which raises and gives an indication that the hook has been taken. The device can be then grasped by the handle hole lifted from the ice and the reel rotated by actuating the handle so as to draw in the line and the fish.

Since various modifcations can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. An ice fishing rig comprising a rigid base plate member having transverse dimensions sufficient to cover a hole formed in the ice and to stably support the rig on the ice, a hole formed through the plate member from an upper surface above the ice to a lower surface adjacent the water, a support member attached to said plate member and upstanding therefrom at a position adjacent to one side of the hole, a reel mounted on the support member for rotation about a substantially horizontal axis, a line carried on the reel for dispensing therefrom and winding thereon, the reel being arranged on the support member so as to allow dispensing of said line directly through said hole from the reel and a manually graspable handle on the reel for actuation to wind in the line, said base plate member and said upstanding support member being integrally molded from a synthetic plastics material, said upstanding support member comprising an elongate substantially planar portion integrally connected to the base portion along the full length of an underside thereof.

2. The invention according to claim 1 wherein the synthetic plastics material is black in colour so as to attract solar heat.

3. The invention according to claim 1 wherein the base plate member is hollow with the hole integrally molded therein so as to form a closed sleeve surrounding the hole to prevent ingress of water into the molding from the hole.

4. The invention according to claim 1 wherein said planar portion has an opening therethrough dimensioned to receive the fingers of a user as a handle hole.

5. The invention according to claim 1 wherein the base plate member includes a plug portion extending downwardly from an underside thereof which is circular in cross section and having a transverse dimension sufficient to cover the cross-sectional area of the hole such that the plug portion closes the hole and projects downwardly at least partly into the hole.

6. The invention according to claim 5 wherein the plug portion is tapered so as to increase in diameter from a lower most smallest diameter to an upper most largest diameter.

7. The invention according to claim 6 including an upper cylindrical surface of diameter larger than that of the largest diameter at the upper end of the tapered portion, said cylindrical surface extending downwardly from an underside of the base plate member.

8. The invention according to claim 5 wherein the plug portion is shaped to provide along its length from a lower most portion thereof to an upper most portion thereof a plurality of different diameters for engaging different diameters of hole.

9. The invention according to claim 1 wherein the hole through the base plate member is of a transverse dimension sufficient merely to receive the line and to allow threading of the line therethrough.

10. The invention according to claim 1 wherein the height of the support member and the position of the reel on the support member is such that the reel is arranged closely adjacent the base plate member.

11. The invention according to claim 1 including a signal member, means mounting the signal member for pivotal movement on said rig, means for biasing said signal member into a raised position and means for latching said signal member on said reel at a lowered position thereof such that movement of the reel releases the signal member for movement to said raised position.

12. The invention according to claim 11 wherein the signal member comprises a rod shaped and arranged to latch under the manually graspable handle of the reel when said handle is at an upper most position thereof so that movement of the handle away from the upper most position releases the rod for movement into said raised position.

13. An ice fishing rig comprising a rigid base plate member having transverse dimensions sufficient to cover a hole formed in the ice and to stably support the rig on the ice, a hole formed through the plate member from an upper surface above the ice to a lower surface adjacent the water, a support member attached to said plate member and upstanding therefrom at a position adjacent to one side of the hole, a reel mounted on the support member for rotation about a substantially horizontal axis, a line carried on the reel for dispensing therefrom and winding thereon, the reel being arranged on the support member so as to allow dispensing of said line directly through said hole from the reel and a manually graspable handle on the reel for actuation to wind in the line, said base plate member being integrally molded from a synthetic plastics material and including a plate portion and a plug portion extending downwardly from an underside of the plate portion which is circular in cross section and has a transverse dimension defining a first plug portion thereof which has an outer surface tapered from an uppermost largest diameter thereof to a lowermost smallest diameter thereof, and a second plug portion between said first plug portion and said plate portion which has an outer cylindrical surface of diameter larger than said largest diameter of said first plug portion such that the plug portion closes the hole and projects downwardly at least partly into the hole.

14. The invention according to claim 13 including a signal member, means mounting the signal member for pivotal movement on said rig, means for biasing said signal member into a raised position and means for latching said signal member on said reel at a lowered position thereof such that movement of the reel releases the signal member for movement to said raised position.

15. The invention according to claim 14 wherein the signal member comprises a rod shaped and arranged to latch under the manually graspable handle of the reel when said handle is at an upper most position thereof so that movement of the handle away from the upper most position releases the rod for movement into said raised position.

* * * * *